(12) United States Patent
Miyasaka (10) Patent No.: US 7,553,445 B2
(45) Date of Patent: Jun. 30, 2009

(54) MANUFACTURING PROCESSES OF SINTERED ALLOY AND OIL-IMPREGNATED SINTERED BEARING

(75) Inventor: Motohiro Miyasaka, Chiba (JP)

(73) Assignee: Hitachi Powdered Metals Co., Ltd. (JP)

( * ) Notice: Subject to any disclaimer, the term of this patent is extended or adjusted under 35 U.S.C. 154(b) by 0 days.

(21) Appl. No.: 10/938,437

(22) Filed: Sep. 9, 2004

(65) Prior Publication Data
US 2005/0063856 A1 Mar. 24, 2005

(30) Foreign Application Priority Data
Sep. 10, 2003 (JP) ............... 2003-317834

(51) Int. Cl.
B22F 1/00 (2006.01)
B22F 3/11 (2006.01)

(52) U.S. Cl. .............. 419/38; 419/2; 419/23; 419/47

(58) Field of Classification Search ............ 419/2, 419/38, 47
See application file for complete search history.

(56) References Cited

U.S. PATENT DOCUMENTS

| | | | | |
|---|---|---|---|---|
| 3,652,261 A | * | 3/1972 | Taubenblat | 75/252 |
| 4,255,193 A | * | 3/1981 | Slesar et al. | 419/19 |
| 4,561,889 A | * | 12/1985 | Oaku et al. | 75/243 |
| 4,698,269 A | * | 10/1987 | Narusch et al. | 428/552 |
| 5,135,566 A | * | 8/1992 | Sakuranda et al. | 75/255 |
| 5,246,771 A | * | 9/1993 | Kawaguchi | 442/68 |
| 6,132,486 A | * | 10/2000 | Dixon | 75/247 |
| 6,589,667 B1 | * | 7/2003 | Hultman et al. | 428/548 |
| 6,737,016 B2 | * | 5/2004 | Shikata et al. | 419/27 |
| 2003/0047032 A1 | | 3/2003 | Newman et al. | |
| 2005/0040358 A1 | * | 2/2005 | Chikahata et al. | 251/368 |

FOREIGN PATENT DOCUMENTS

| | | | |
|---|---|---|---|
| GB | 2216543 A | * | 10/1989 |
| JP | S53-038243 | | 10/1978 |
| JP | 64-15522 | | 1/1989 |

(Continued)

OTHER PUBLICATIONS

Peter W. Lee et al., "ASM Handbook vol. 7 Powder Metal Technologies and Application", 1998 (US), p. 110-122.

(Continued)

Primary Examiner—Harry D. Wilkins, III
Assistant Examiner—Nicolas A. Smith
(74) Attorney, Agent, or Firm—Kilpatrick Stockton LLP (57) ABSTRACT

Disclosed is a manufacturing process of a sintered iron-copper base porous alloy and of an oil-impregnated sintered bearings, having the steps of: preparing a mixed powder comprising an iron powder, and at least one of a copper powder and a copper alloy powder; forming the mixed powder into a green compact; and sintering the green compact to obtain a sintered iron-copper base porous alloy. The iron powder contains a porous iron powder which has a particle size of 177 microns or less and a specific surface area of 110 to 500 $m^2$/kg according to a gas adsorption method. The sintered compact has high intercommunicating porosity and low permeability, and it is sized to prepare the sintered bearing into which a lubricating oil is impregnated.

14 Claims, 6 Drawing Sheets

FOREIGN PATENT DOCUMENTS

| | | |
|---|---|---|
| JP | 8-20836 | 1/1996 |
| JP | 2002-105501 | 4/2002 |
| JP | 2002-106568 | 4/2002 |
| JP | 2003-120674 * | 4/2003 |
| JP | 2003-120674 A | 4/2003 |
| WO | WO/1999/008012 | 2/1999 |

OTHER PUBLICATIONS

Catalogue of NTN Bearphite Oil-impregnated Sintered Bearings, Feb. 1991.

Catalogue of products by Porite Corporation, Mar. 1999.

Hitachi Powered Metals Technical Report, No. 1, New Technologies, Oct. 1, 2002.

* cited by examiner

MANUFACTURING PROCESSES OF SINTERED ALLOY AND OIL-IMPREGNATED SINTERED BEARING

BACKGROUND OF THE INVENTION

1. Field of the Invention

The present invention relates to a process for manufacturing a sintered iron-copper base porous alloy which is used for production of an oil-impregnated sintered bearing applied for various motors, and a process for manufacturing an oil-impregnated sintered bearing.

2. Related Art

Many of oil-impregnated iron-base sintered bearings are made of iron-copper base alloy. The iron-copper base alloy includes iron-bronze alloy, iron-brass alloy and alloy further containing another component such as Ni, Co, P, Pb, solid lubricants such as graphite, molybdenum disulfide, and the like. Illustrating a manufacturing process of the iron-bronze base sintered alloy by way of example, a powder of reduced iron or an atomized iron powder is used as a raw material iron powder. And, to this raw material added are an electrolyzed copper powder and a tin powder, or a bronze alloy powder, as a raw material for the bronze alloy phase, and a very small amount of a molding lubricant as necessity arises, to prepare a mixed powder. The mixed powder is compression-molded to form a compact, and it is then sintered by heating it in a reductive gas atmosphere such as a mixed gas of nitrogen and hydrogen. The sintered body obtained is subjected to sizing and cutting processing, for adapting it to dimensional accuracy required for the bearing and adjusting the pore condition of its bearing surface, if necessary. It is further subjected to impregnating into the pores a lubricating oil having viscosity suitable for its use condition, obtaining an oil-impregnated sintered bearing.

The material constituting an oil-impregnated sintered bearing for motors is required to be an alloy which is excellent in sliding property and simultaneously has high oil impregnation capability, and the oil pressure of a lubricant film must be retained so that familiarity at the initial of operation is good and sliding friction is little. It is known that a bearing for a motor used in cold districts in particular generates squeaky noises at sliding when the permeability of the bearing is high.

In this connection, it is described in Japanese Patent Application Laid-Open (JP-A) No.S64-15522 that the permeability of a bearing is lowered by using a finer complex powder as a raw materials so that an oil film is easily formed on the sliding surface, and thereby, a lubricating oil is hardly escaped out from the sliding surface into the bearing. On the other hand, Japanese Patent Application Laid-Open (JP-A) No. H8-20836 discloses that an oil-impregnated sintered bearing, having an inner layer portion in which the porosity is 25% by volume or more and an outer layer portion in which the porosity is 16% by volume or less, is produced by forming an alloy layer having a different composition on the surface of a molded and sintered body, in order to provide an oil-impregnated bearing which has good wear resistance and familiarity. It is also described in the above document that the permeability is 30 Darcy or less. On the other hand, it is proposed in Japanese Patent Application Laid-Open (JP-A) No. 2003-120674 that, for an oil-impregnated sintered bearing for electric motors, a bearing being composed of a sintered alloy having an intercommunicating porosity of 20 to 30% and having a permeability of 6 to $50 \times 10^{-11}$ cm$^2$ is impregnated with synthetic oil having a kinematic viscosity of 61.2 to 74.8 mm$^2$/s. It also discloses that squeaky noise is not generated even if it is operated in a cold district environment, and that a spongy-like reduced iron powder having a particle size of 145 meshes minus sieve is used as a raw material powder in manufacture of the oil-impregnated sintered bearing.

However, when a fine raw material powder is used in like manner as in the above-mentioned JP-A S64-15522, the intercommunicating porosity of a sintered bearing also decreases and oil storage capability is reduced. They are not advantageous from the viewpoint of durability. Moreover, when an outer layer portion having different materials is provided in like manner as in the above-mentioned JP-A H8-20836, probability of generating strains and the like between the layers is raised due to the difference of materials, and problems are caused for mechanical strength, durability and the like. It is not advantageous from the viewpoints of simplification of its manufacturing process and the like, either.

In general, there is a correlation between the intercommunicating porosity of a sintered porous alloy and its density. Specifically, when the density is lessened, the intercommunicating porosity is raised and oil storage capability also increases. However, the permeability is also increases. Therefore, discharge of the impregnated lubricating oil from the bearing to the sliding surface and escape from the sliding surface to its inside become large, and that makes difficult to maintain the oil pressure. For decreasing the permeability, it is important to reduce the opening of pores on the bearing surface. In order to do that, it is effective to control the degree of processing when the inner bore surface (namely, the bearing surface) of the sintered porous bearing is sized, in such a manner that the surface portion is appropriately densified. However, if the sintered porous alloy has rough pores, it is required to enlarge the processing degree of sizing, in order to make small the rough pores opened to the inner borer surface, and the sizing power easily affects into the depth of the bearing. This causes reduction of the intercommunicating porosity of the bearing. Therefore, reduction of the permeability by means of sizing should be limitedly utilized. On the other hand, if the compacting pressure is raised or if a finer powder is used as a raw material powder in order to make small the pores of the sintered porous alloy, the density of the sintered alloy increases and the intercommunicating porosity is reduced.

It is therefore necessary to take many factors into consideration for control of manufacture, in order to realize an oil-impregnated sintered bearing in which the permeability is reduced while requisite intercommunicating porosity is maintained. Moreover, without employing complicated steps, such a bearing cannot be easily manufactured while strength and durability are retained on the bearing as a whole.

SUMMARY OF THE INVENTION

The object of the present invention is to provide an oil-impregnated sintered bearing which has a long-life and a reliable durability at being mounted on a device and used, without application of a complicated manufacturing process.

Moreover, the object of the present invention is to provide an oil-impregnated sintered bearing, which does not generate squeaky noise during use as a sliding bearing of a motor even in a low-temperature environment, and which has excellent sliding property to provide stable operation.

In order to achieve the above object, according to one aspect of the present invention, a manufacturing process of a sintered iron-copper base porous alloy for oil-impregnated sintered bearings, comprises: preparing a mixed powder comprising an iron powder, and at least one of a copper powder and a copper alloy powder, the iron powder comprising a porous iron powder which has a particle size of 177 microns or less and a specific surface area of 110 to 500 m²/kg according to a gas adsorption method; forming the mixed powder into a green compact; and sintering the green compact to obtain a sintered iron-copper base porous alloy.

Moreover, according to another aspect of the present invention, a manufacturing process of an oil-impregnated sintered bearing, comprises: preparing a mixed powder comprising an iron powder, and at least one of a copper powder and a copper alloy powder, the iron powder comprising a porous iron powder which has a particle size of 177 microns or less and a specific surface area of 110 to 500 m²/kg according to a gas adsorption method; forming the mixed powder into a green compact having a shape approximately corresponding to a sintered bearing which is to be oil-impregnated; and sintering the green compact to obtain a sintered compact composed of an iron-copper base porous alloy.

BRIEF DESCRIPTION OF THE ACCOMPANIED DRAWINGS

The features and advantages of the manufacturing process according to the present invention over the proposed art will be more clearly understood from the following description of the embodiments of the present invention taken in conjunction with the accompanying drawings in which.

DETAILED DESCRIPTION OF THE INVENTION

For many oil-impregnated sintered bearings which are made of an iron-copper base alloy and used as a sliding bearing, the relationship between the change of coefficient of friction and the generation of squeaky noise on the bearing has been researched on a motor which is driven in a low-temperature environment of about −30 degrees C. As a result of research, it has been found that, if the initial coefficient of friction is high and if the coefficient of friction thereafter falls remarkably, the squeaky noise tends to occur, and that the noise occurs just after the fall of the coefficient of friction. To the contrary, if the initial coefficient of friction is comparatively low and if the drop of the coefficient of friction thereafter is small, the squeaky noise does not occur. Moreover, it has also been found that the lower the distribution range of pore size of a sintered bearing is, the lower the occurrence frequency of squeaky noises is, and, the lower the distribution range of size of open pores is, the lower the occurrence frequency of the squeaky noises is.

In view of the viscosity of a lubricating oil that is remarkably high at −30 to −40 degrees C., the results of the research mentioned above can be elucidated as follows. Namely, the lubricating oil, existing much at a gap between the bearing surface and the shaft, makes large the initial rotational resistance when starting the rotation of the shaft on the contrary, and the exhaustion of lubricating oil also increases so that the lubricating oil rapidly decreases. According to the decrease of lubricating oil, the sliding frictional force drops and vibration occurs easily due to this fluctuation, thereby making the squeaky noise. Moreover, it has also been found with respect to the relationship between generation of the squeaky noise and the permeability of the sintered bearing, that the occurrence frequency of the squeaky noise is 80% when the permeability of a sintered bearing is $50 \times 10^{-11}$ cm², and 20% at $10 \times 10^{-11}$ cm², and the noise is hardly made at $2 \times 10^{-11}$ cm². Namely, the lower the permeability is, the less the squeaky noise occurs. This is also coincided with the above-mentioned elucidation.

In this connection, if capillary action at the gap between the bearing surface and the rotational shaft is stronger than capillary attraction in the pores on the inside of the bearing, the lubricating oil becomes less at the gap between the bearing surface and the shaft when the rotation of the shaft is stopped. It is therefore effective for preventing the squeaky noise to reinforce the capillary attraction in the pores on the inside of the bearing. Accordingly, it is important to increase and make fine the pores on the inside of the bearing. This is an issue on the metallographic structure of the sintered bearing, and it cannot be attained by sizing the sintered bearing to make less the opening of pores on the sliding surface.

In relation to the above-mentioned description, the prior Japanese patent application by the applicant of the present application, Laid-Open No. (JP-A) 2003-120674, suggests that the pores are also formed in the iron particles in the sintered alloy by using a spongy-like reduced iron powder (trade name: DNC-180, manufactured by Dowa Iron Powder Co., Ltd.) which is a minus sieve fraction of 145 meshes, as a raw material iron powder for producing the oil-impregnated sintered bearing. It is effective as a method of making fine the pores on the inside of the bearing, to use an iron powder having pores on the inside of the particles. However, the spongy-like reduced iron powder used in JP-A 2003-120674 has the particle size of 145 meshes minus sieve, and the specific surface according to a gas adsorption method (BET method) is 100 m²/kg. This value of specific surface is not large by comparison nevertheless the particles are small, and it equally means that the pores are not fine. In fact, the surfaces of the particles are uneven but internal pores are not very much. Using the above-mentioned spongy-like reduced iron powder to produce a sintered bearing, fine pores certainly exist in the iron particles which compose the metallographic structure, however, a lot of pores are closed by another phase or the like on the surface of iron particles. Namely, there are a lot of pores which are not effective for oil impregnation. The present invention improves this point and suggests a method of manufacturing a sintered bearing which is composed of an iron-copper base porous alloy having a metallographic structure with high intercommunicating porosity nevertheless the pores are fine and the permeability is low.

In the present invention used is a porous iron powder in which particle size is rather large and which is fine porous, as a raw material iron powder, for the above-mentioned improvement. Specifically, a porous iron powder in which the particle size is 80 meshes minus sieve (namely, a particle size of 177 microns or less) and the specific surface is 110 to 500 m$^2$/kg is used. In accordance with this, fine open pores which are linked with other pores on the inside of the iron particles in the metallographic structure are increasedly produced, and the improvement of intercommunicating porosity and the diminishing in size of pores of the sintered bearing are simultaneously attained. Since the pores are fine over the whole sintered bearing, the opening of pores at the inner bore surface are also made narrow and they can be closed easily by carrying out the usual sizing processing of the inner bore surface of the sintered bearing. Accordingly, the permeability of the sintered bearing can be easily decreased to an appropriate level.

Moreover, as understood from Examples described later, it is not required that whole of the raw material iron powder for manufacturing the sintered bearing be the porous iron powder that the particle size is large and the specific surface is large as described above, and it is allowed to use a mixed powder of the above-mentioned porous iron powder with a common reduced iron powder or an atomized iron powder. The larger the proportion of porous iron powder in the mixed powder is, the more adaptably a sintered bearing having low permeability and high intercommunicating porosity is obtained. Here, it is noted that the porous iron powder is apt to form the high proportion of pretty fine particles by crushing and the like during the manufacturing work. Therefore, if it is limited to only particles of a preferable particle size, it is suitable to use a fraction of 325 meshes plus sieve and 80 meshes minus sieve (i.e. a particle size of 44 to 177 microns) which is obtained by sieve classification of the porous iron powder. However, as described above, since a common iron powder is not necessarily excluded, there is no problem in using a porous iron powder having a particle size of 80 meshes minus sieve including rather fine particles. It is preferred that a subsieve fraction is 35% by mass or less of the whole iron powder. Rough or large particles having a particle size exceeding 177 microns (80 meshes plus sieve) are not preferable because the porous structure of the sintered bearing are made rough.

According to the present invention, the process of manufacturing the oil-impregnated sintered bearing and the raw materials to be used for manufacture are specifically described below.

(1) Alloy Composition of Sintered Bearing

The sintered alloy composing the sintered bearing of the present invention is iron-copper base alloy which includes iron-bronze alloy, iron-brass alloy and the like, and the composition of the iron-copper base alloy can be defined as comprising, by mass, 1 to 50% of copper, 0 to 4 % of carbon, 0 to 3% of tin, 0 to 7% of zinc, 0 to 1% of other components (nickel, boron, phosphorus, lead, etc.) and the balance iron. In particular, such an iron-copper base alloy that the copper content is 10 to 35% by mass and the tin content is 0.5 to 1.7% by mass is preferable. For example, the present invention is applicable to the alloy compositions such as Nos. 1 to 9 shown in Table 1.

In accordance with the above alloy composition, a mixed powder is prepared by blending a simple powder of each of composing components. It is then compression-molded to form a green compact in a shape approximately corresponding to the bearing, and the compact is sintered. As to the components, Sn, Zn, Ni, B, P, Pb, etc., it is alternatively possible to blended them into the mixed powder by using a copper alloy powder containing each of them. As occasion requires, a solid lubricant such as graphite powder, a molybdenum disulfide powder and the like, and a powder lubricant such as metal soaps including zinc stearate, wax for powder metallurgy and the like can be used.

TABLE 1

| | Composition (% by mass) | | | | | |
|---|---|---|---|---|---|---|
| No. | Cu | C | Sn | Zn | Others (Ni, B, P, etc.) | Fe |
| 1 | 1-3 | 0.2-0.6 | — | — | — | balance |
| 2 | 2-5 | 1-4 | — | — | — | balance |
| 3 | 14-20 | 1-4 | — | — | — | balance |
| 4 | 10-15 | — | 2 | — | — | balance |
| 5 | 10-15 | — | 2 | — | ≦1 | balance |
| 6 | 18-22 | — | 1-3 | 2-7 | ≦0.1 | balance |
| 7 | 29-34 | 0.5 | 2 | — | ≦1 | balance |
| 8 | 30-32 | 2 | 2 | — | — | balance |
| 9 | 50 | 0.5 | 2 | — | ≦0.3 | balance |

(2) Raw Material Iron Powder

A raw material iron powder is a powder having a particle size corresponding to a 80 meshes minus sieve fraction, and at least a portion of it comprises the porous iron powder having a specific surface of 110 to 150 m$^2$/kg. For the other portion, a common non-porous iron powder, i.e., a reduced iron powder or an atomized iron powder which is generally used can be used to be blended. The proportion of the porous iron powder in the raw material iron powder is 25% by mass or more, and preferably 50% by mass or more.

(2-1) Reduced Iron Powder and Atomized Iron Powder

Iron powders commercially available in general for manufacture of sintered porous alloys belong to a reduced iron powder or an atomized iron powder (aqueous atomized iron powder), and they have a particle size corresponding to 80 meshes minus sieve (a particle diameter of 177 microns or less) and an apparent density of about 2.4 to 3.0 Mg/m$^3$. They can be used for a portion of the raw material iron powder. The specific surfaces of them according to a gas adsorption method (BET method: according to the prescription of ISO 9277) are, generally, 60 to 80 m$^2$/kg for the reduced iron powder and 80 to 100 m$^2$/kg for the atomized iron powder. Comparing these powders with each other, particles of the atomized iron powder have less pores on the inside, and those of the reduced iron powder have a more uneven surface and more pores on the inside than the atomized iron powder.

(2-2) Porous Iron Powder

The porous iron powder used in the present invention is a powder having a particle size of 80 meshes minus sieve (a particle diameter of 177 microns or less) and a specific surface according to a BET method of 110 to 500 m$^2$/kg, and an apparent density is about 1.3 to 2.5 Mg/m$^3$. Particles of such porous iron powder have a quite uneven surface, and a large number of fine pores which are linked to the surface of particle are observed in the microscopic view of particle sections. The porous iron powder is prepared, for example, by the production process described in Japanese Patent Application Laid-Open (JP-A) No. 2002-105501. The specific surface of the porous iron powder can be controlled in accordance with the reduction condition of the production process, and an iron powder having a specific surface of about 1000 m$^2$/kg can also be obtained. However, if the specific surface of the porous iron powder is excessively large, it is apt to mean that a large amount of extremely fine particles are contained in the powder, and that many closed pores are to be formed in the sintered alloy manufactured using it. Therefore, it is essential in the present invention that the specific surface does not exceed 500 m$^2$/kg. Examples of commercially available porous iron powders which are preferably used in the present invention include the products which are provided by Hoganas AB of Sweden with trade names of LD80 (specific surface: about 200 m$^2$/kg), P100 (specific surface: about 175 m$^2$/kg) and R12 (specific surface: about 225 m$^2$/kg) and the like.

(3) Raw Material Copper Powder

The raw material copper powder to be used can be appropriately selected from the commercially available copper powder products having various particle sizes. Since the copper powder is melted during sintering, it is important that a copper powder which is adequately fine in comparison with the particle size of the iron powder is used so that rough pores are not produced around the iron particles in the sintered alloy, and that a copper powder having a quality as homogeneous as possible is used so as to prepare a green compact in which the copper powder is uniformly disposed around the iron particles. Specifically, it is preferred that 60% by mass or more of the raw material copper powder is occupied with a sub sieve fraction, and examples of such a copper powder that is commercially available include an electrolyzed copper powder product provided by Fukuda Metal Foil & Powder Co., Ltd. of Japan with a trade name of CE15 or other copper powder products having an particle size equivalent to the above product.

The portion of the raw material copper powder can be replaced with a powder of copper foil in order to suppress the permeability of sintered alloy to a low level. The use of powder of copper foil is effective for making complicate the linking passes of pores in the sintered alloy and decreasing the permeability. Examples of the powder of copper foil which can be suitably used and which is commercially available include a copper powder product provided by Fukuda Metal Foil & Powder Co., Ltd. of Japan with a trade name of Cu—S-100 (particle size: 100 meshes minus sieve or less).

(4) Raw Material Tin Powder

It is used in manufacture of a sintered bearing made of iron-bronze alloy. It is the same to the raw material copper powder that a tin powder which is adequately fine in comparison with the particle size of the iron powder is suitably used, so as not to produce rough pores around the iron particles in the sintered alloy. Specifically, it is preferred that 85% by mass or more of the tin powder is occupied with a sub sieve fraction.

(5) Raw Material Zinc Powder

It is used in manufacture of a sintered bearing made of an iron-brass alloy. It is the same to the raw material copper powder that a zinc powder which is adequately fine in comparison with the particle size of the iron powder is suitably used, so as not to produce rough pores around the iron particles in the sintered alloy. Specifically, it is preferred that 50% by mass or more of the zinc powder is occupied with a sub sieve fraction.

(6) Raw Material Powders for other Components

Since the blending proportions of the components, Sn, Zn, Ni, B, P and Pb are little, if each of them is blended in the form of alloy powder containing it, the blending proportions of them can be easily and accurately adjusted. The raw material powders to be used can be suitably selected from commercially available copper alloy powders. For example, powders of Cu-10% Sn alloy, Cu-10% Sn-1% Pb alloy, Cu-35% Zn alloy, Cu-30% Ni alloy, Cu-15% Ni-1.5% B alloy, Cu-8% P alloy (each composition ratio being by mass) and the like are commercially available and they can be suitably used.

For Pb and Ni, a lead powder and a nickel powder may be alternatively used in the like manner as the conventional art.

It is preferable that these raw material powders have a particle size such that 50% by mass or more is occupied with a subsieve fraction.

(7) Powder Lubricant

Powder lubricants such as metal soaps including zinc stearate, wax for powder metallurgy and the like can be used so that the compressibility and compactibility of the mixed powder are improved and a green compact is easily taken out from a die, and if necessary, solid lubricants such as a graphite powder and a molybdenum disulfide powder can be used in order to improve abrasion resistance or lubricity of the oil-impregnated sintered bearing. These lubricant powders can be used by suitably selecting from commercially available products.

(8) Mixing, Compacting and Sintering

The above-mentioned raw material powders are blended in accordance with the alloy composition of the sintered bearing to be manufactured, to prepare a mixed powder. The mixing of powders is similar to the conventional methods, and it is not specifically limited. The mixed powder is compression-molded to form a green compact having a shape approximately corresponding to the bearing, using a die in the like manner as the conventional method.

The shape and density of the green compact is appropriately designed according to the use of the bearing, and the green compact is formed so that the sintered product has slightly large dimensions (the inner bore is slightly small), considering the dimensional change caused by sizing after sintering, etc. The compact density is generally adjusted within a range of 5.5 to 6.5 Mg/m$^3$ and the adjustment can be performed by controlling the compacting pressure.

The green compact is sintered in a reductive gas atmosphere. The sintering temperature is preferably about 750 to 850 degrees C. in the case of the alloy composition in which the copper content is about 20% by mass or more, and about 1,000 to 1,150 degrees C. in the case of an alloy composition in which the copper content is less than 20% by mass.

Through the above-described manufacturing process, it is possible to obtain a sintered compact being composed of a sintered porous iron-copper base alloy in which the density is 5.7 to 6.6 Mg/m$^3$ and the intercommunicating porosity is about 29 to 17% by volume. In this sintered compact, the pores are dispersed fine and the permeability is low, in comparison with the conventional sintered alloy manufactured by using a reduced iron powder. The permeability of the sintered compact of the present invention is $9 \times 10^{-11}$ to $13 \times 10^{-11}$ cm$^2$ in a case of having an intercommunicating porosity of 25%, and $12 \times 10^{-11}$ to $18 \times 10^{-11}$ cm$^2$ in a case of having an intercommunicating porosity being 27%. Such a permeability is about a half of that of the conventional sintered alloy using a reduced iron powder. As mentioned above, the sintered alloy of the present invention has a relatively low permeability, in spite of having a large intercommunicating porosity, and such a sintered compact can be easily processed into a sintered bearing which provides through the oil impregnation step a suitable oil-impregnated sintered bearing for use in cold districts.

(9) After-Processing (Sizing)

The sintered body, which is produced considering the sizing, is finished by sizing, to obtain a sintered bearing for motors which has an aimed dimension and shape. If the difference from the aimed dimension is larger than the suitable processing amount by the sizing, the dimensions of the sintered compact before the sizing can be approached to the aimed dimensions by carrying out a cutting processing using a grinder and the like. The permeability of the sintered compact can be easily reduced at the sizing to be a preferable value by narrowing or closing the opening of pores on the surface of the sintered body. The opening of pores on the surface can also be narrowed or closed at cutting an inner diameter face by a grinder.

When dirt or an adhered article are observed on the sintered bearing after the after-processing, they can be removed by carrying out ultra sonic rinsing using an organic detergent and the like, if necessary.

(10) Impregnation of Lubricating Oil

The lubricating oil to be impregnated in the sintered bearing is suitably decided in accordance with the using environment and sliding conditions of the bearing. A lubricating oil having a viscosity of the spindle oil class to the gear oil class can be adapted, and usual lubricating oil, synthetic oil, lubricating oil containing wax and the like are possibly used. In the case of a bearing for a motor used in cold districts, a synthetic oil equivalent to that of a viscosity grade, ISO VG68, or, one having a kinematic viscosity of 61.2 to 74.8 $mm^2/s$ at 40 degrees C. is preferable.

The impregnation of the lubricating oil can be carried out on the sintered body after the after-processing, but it is also possible to perform before the after-processing. If the after-processing is carried out after the oil impregnation, a cutting liquid which is commonly used at the cutting processing is unnecessary. In this case, it is possible to prevent the pores of the sintered body from pollution by other things than the lubricating oil and processability is also improved. Moreover, a real oil content of the oil-impregnated sintered bearing can be substantially equalized to the intercommunicating porosity.

It is also possible to further decrease the permeability of the sintered bearing by coating the surface of the sintered bearing, excepting the inner bore surface, with a thin layer of copper.

EXAMPLES

The embodiments of the present invention are further illustrated below, referring to examples.

Example 1

In each of samples S1 to S4, a raw material iron powder, a raw material copper powder and a raw material tin powder were blended and in accordance with the whole composition of 20% Cu, 1% Sn and the balance Fe by mass, and zinc stearate as a powder lubricant was further added to the above powders at a ratio of 0.3% relative to the total mass to prepare a mixed powder. At this time, an electrolyzed copper powder (trade name: CE15) manufactured by Fukuda Metal Foil & Powder Co., Ltd. was used as the raw material copper powder. As the raw material iron powder, a reduced iron powder (trade name: NC100-24) manufactured by Hoganas AB of Sweden and a porous iron powder (trade name: LD80) manufactured by Hoeganas corporation were used, and they were blended at a proportion shown as described below.

| Sample: | Contents of raw material iron powder |
|---|---|
| S1: | The porous iron powder of 100% by mass |
| S2: | The reduced iron powder of 100% by mass |

-continued

| Sample: | Contents of raw material iron powder |
|---|---|
| S3: | The reduced iron powder of 50% by mass and the porous iron powder of 50% by mass |
| S4: | The reduced iron powder of 70% by mass and the porous iron powder of 20% by mass |

Figure 10A:
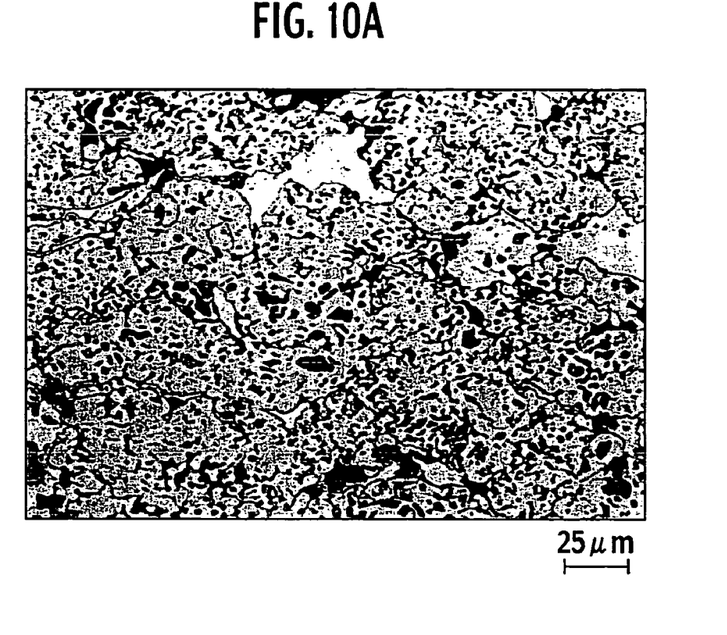
FIG. 10A and FIG. 10B are microscopic photographs, each showing the metallographic structure of a sections of the sintered body (10A: Sample S1, 10B: Sample S2) of FIG. 1.
Figure 10B:
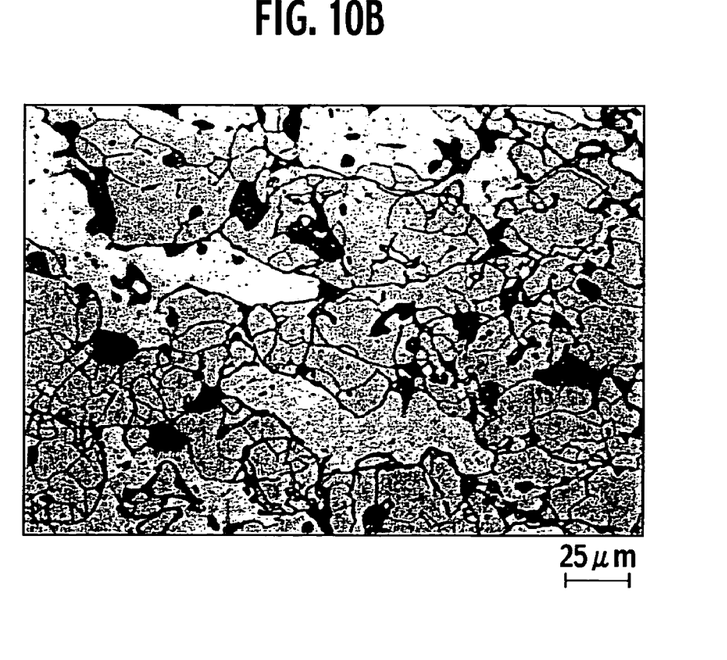

The mixed powder of each of the samples S1 to S4 was compression-molded to form a green compact of a columnar shape (outer diameter: 18 mm, inner diameter: 10 mm, and length: about 10 mm) using a compacting die. At this time, a plural number of green compacts each having a different green density were prepared for respective samples by changing the compacting pressure. The green compacts prepared were sintered by heating them at 780 degrees C. in nitrogen/hydrogen mix gas for 0.5 hours to obtain sintered bearings. Each of the sintered bearings was subjected to measurement of the density, the permeability, the intercommunicating porosity (volume percentage), the apparent hardness of surface, and the radial crushing strength according to the conventional methods. Graphs showing the relationship between the density and the intercommunicating porosity (FIG. 1), the relationship between the density and the permeability (FIG. 2), the relationship between the intercommunicating porosity and the permeability (FIG. 3), the relationship between the density and the radial crushing strength (FIG. 4), and the relationship between the density and the apparent hardness (FIG. 5) were prepared by every sample, using the results of measurement. Moreover, an optical microscopic photograph of section of the sintered compact was taken for each of the sintererd bodies which were prepared from the mixed powders of the samples 1 and 2. FIG. 10A shows the optical microscope photo of the sintered compact of sample S1, and FIG. 10B shows that of the sintered compact of sample S2.

Figure 1:
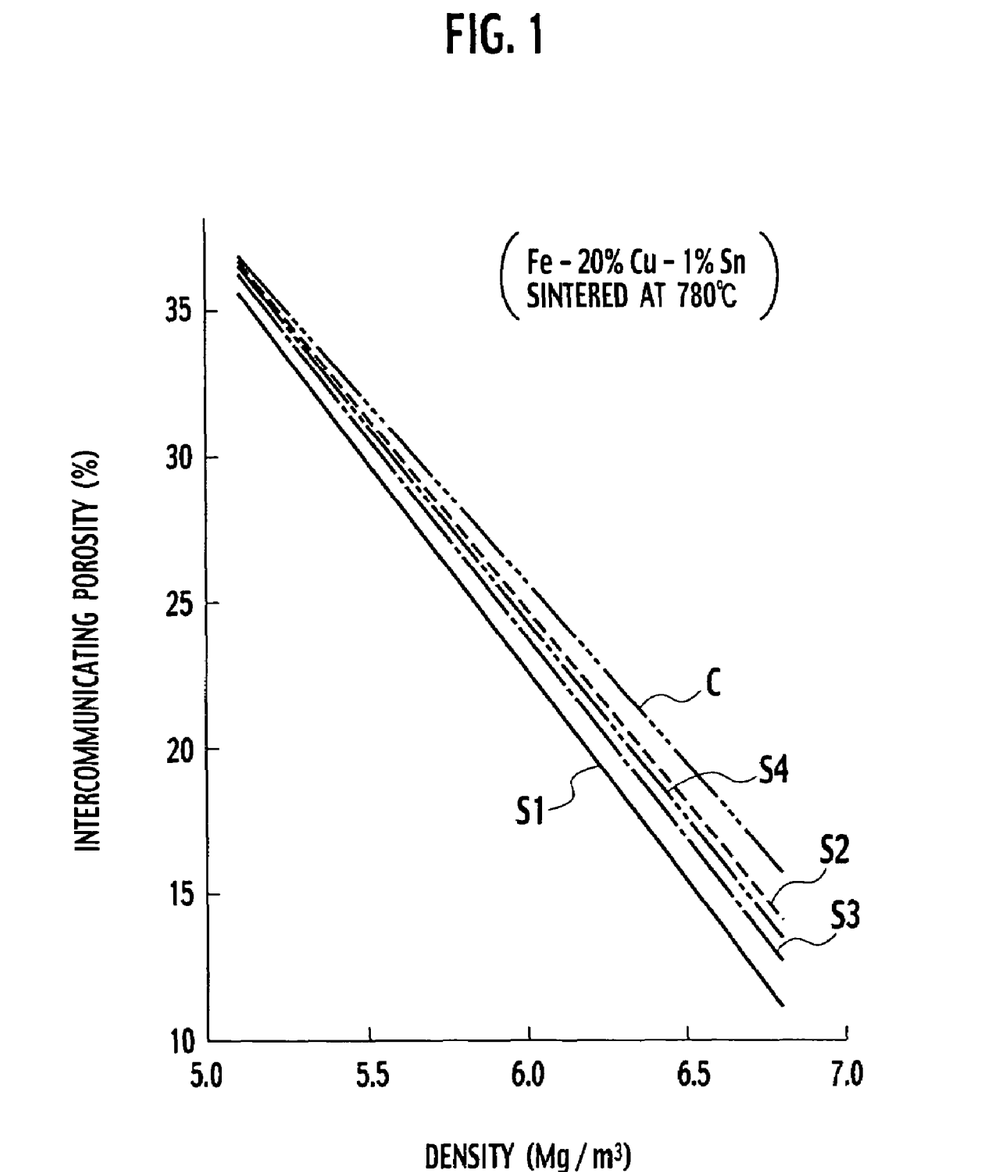
FIG. 1 is a graph showing relationships between the density and the intercommunicating porosity in the sintered bodies produced using a porous iron powder or a normal reduced iron powder.

The porosity of the sintered compact (namely, the percentage of volume of the whole pores to volume of the sintered compact) which is calculated from true density based on the alloy composition and the density of the sintered compact is shown with the line C in the graph of FIG. 1, together with the results of measurement for samples S1 to S4. According to FIG. 1, the intercommunicating porosity of the sintered compact of sample S1 using the porous iron powder is lower than that of sample S2 using the common reduced iron powder, nevertheless the sintered bodies have the same density, and the intercommunicating porosity falls in accordance with increase of the ratio of the porous iron powder blended in the raw material iron powder. For example, at the density of 6.5 $Mg/m^3$, the intercommunicating porosity for sample S1 is about 15%, and one for sample S2 is 18%, respectively. Moreover, since the difference between the calculated porosity and the intercommunicating porosity corresponds to the amount of closed pores, FIG. 1 means that the closed pores slightly increases when using the porous iron powder.

Figure 2:
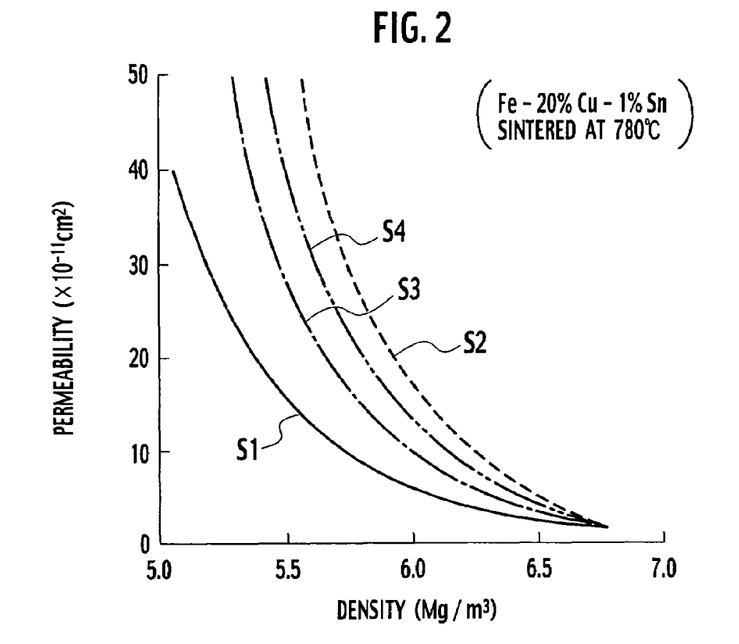
FIG. 2 is a graph showing relationships between the density and the permeability in the sintered bodies of FIG. 1.

On the other hand, according to FIG. 2, in regard to the permeability of the sintered compact, samples S1 and S2 are nearly the same at the density of the sintered compact being 6.8 $Mg/m^3$, irrespective of whether the raw material iron powder used is the porous iron powder or the reduced iron powder. However, at the region of smaller density, the permeability with use of the porous iron powder is clearly smaller than that with the reduced iron powder. For example, the permeability when density is 6.0 $Mg/m^3$ is $6\times10^{-11}$ $cm^2$ for sample S1, and $17\times10^{-11}$ $cm^2$ for sample S2. This is considered because increased permeation resistance due to fine pores affects more remarkably on the permeability in the region of lower density in which the intercommunicating porosity is higher.

Figure 3:
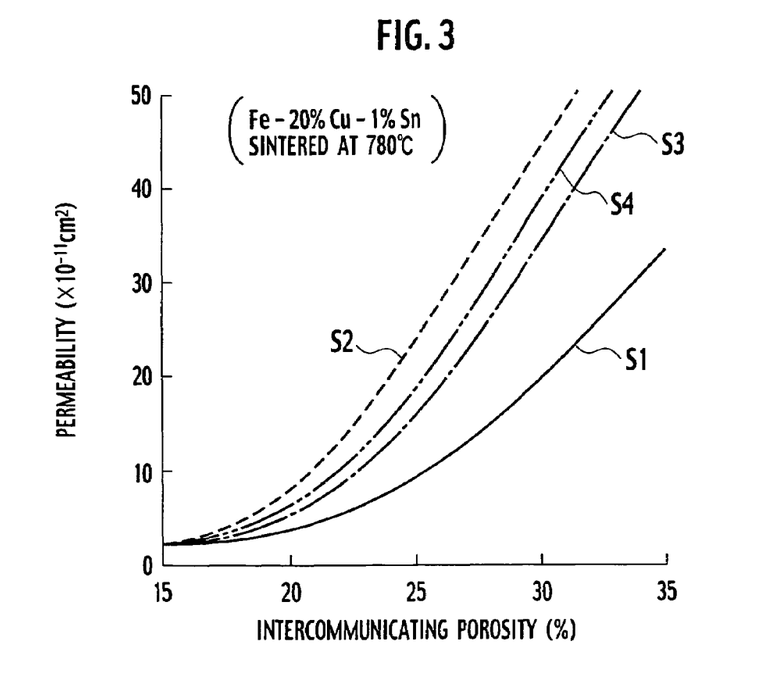
FIG. 3 is a graph showing relationships between the intercommunicating porosity and permeability in the sintered bodies of FIG. 1.

FIG. 3 is a graph showing the relationship between the permeability and the intercommunicating porosity in the combined form of the results of FIG. 1 and FIG. 2. According to this graph, increase of the permeability in accordance with increase of the intercommunicating porosity is less in the case of the sintered compact of sample S1 using the porous iron powder than that of sample S2 using the reduced iron powder. For example, the permeability when the intercommunicating porosity is 25% is $8.5 \times 10^{-11}$ cm$^2$ for sample S1, and $23 \times 10^{-11}$ cm$^2$ for sample S2. In other words, the use of porous iron powder is clearly effective for preparing a sintered compact in which high intercommunicating porosity and low permeability are possibly compatible with each other. Even if a slight amount of closed pores are produced by the use of porous iron powder, the other open pores adequately secure the oil-impregnation capability, and the permeability can be decreased by means of the increased permeation resistance due to fine pore structure.

Figure 4:
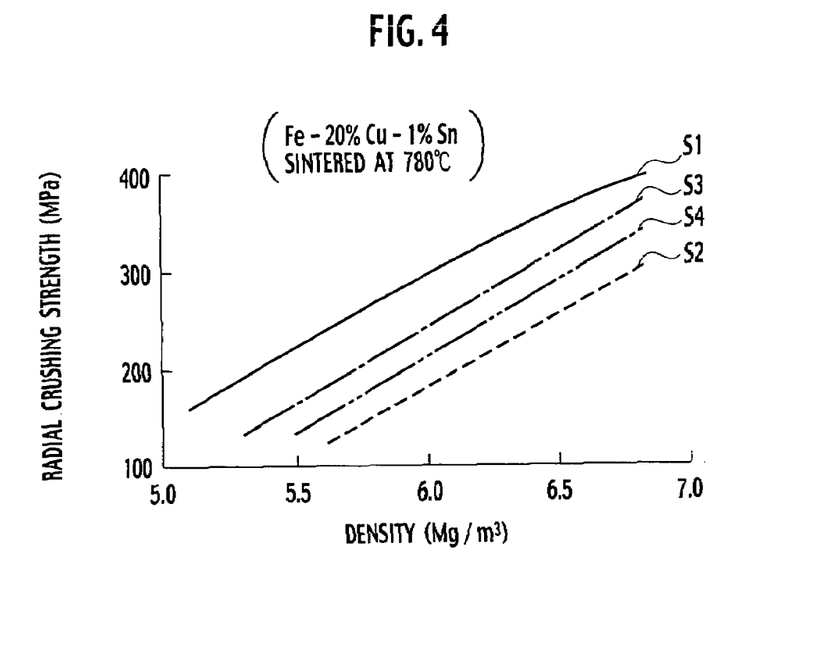
FIG. 4 is a graph showing relationships between the density and the radial crushing strength in the sintered bodies of FIG. 1.

According to the graph of FIG. 4 showing the relationship between the density and the radial crushing strength, the radial crushing strength of sample S1 using the porous iron powder is higher than that of sample S2 using the reduced iron powder. For example, the radial crushing strength when the density is 6.0 Mg/m$^3$ is 290 MPa for sample S1, and 180 MPa for sample S2. This difference is made by whether the pores comprises fine ones on the inside of the iron particles, or rough ones between the iron particles. It is considered that, since the sintered compact of sample S2 using the reduced iron powder has a metallographic structure in which rough pores exist between the iron particles, the stress concentrates to the vicinity of the rough pores to easily make a break, thereby deteriorating the strength. And it is also considered, in contrast, in the sintered compact of sample S1 using the porous iron powder, most of the pores are fine and exist on the inside of the iron particles and such a part that rough pores exist between the iron particles and is easily broken is only a little, thereby the strength is maintained high.

Figure 5:
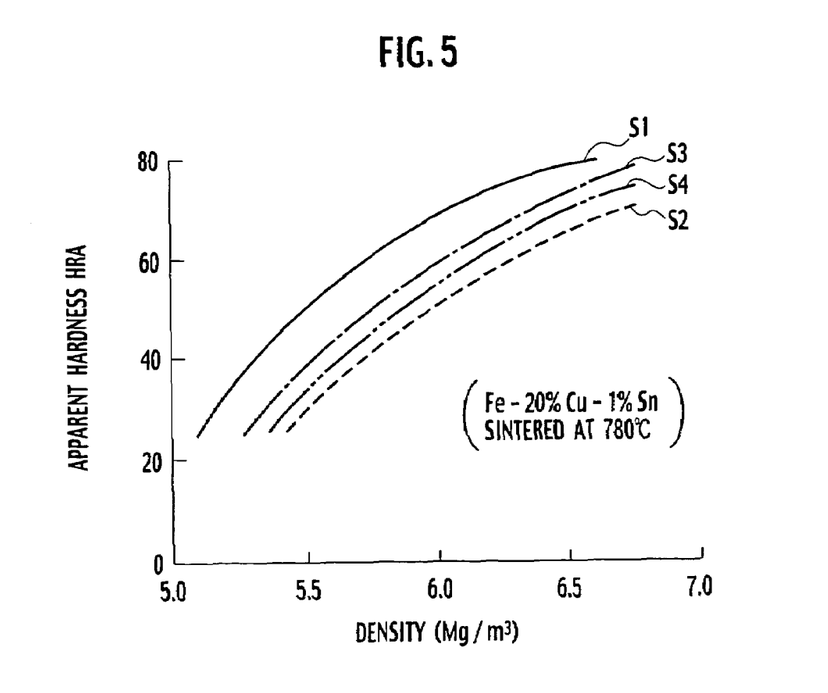
FIG. 5 is a graph showing relationships between the density and the apparent hardness on surface in the sintered bodies of FIG. 1.

Also in the graph of FIG. 5 showing the relationship between the density and the apparent hardness of surface, the sintered compact of sample S1 has an apparent hardness which is higher than that of the sintered compact of the sample S2. For example, the apparent hardness when density is 6.0 Mg/m$^3$ is 70 MPa for sample S1, and 51 MPa for sample S2. This is also similarly considered due to the small size of pores in the metallographic structure.

In any one of FIG. 1 to FIG. 5, the effect of using the porous iron powder is distinctive when the content of the used porous iron powder in the raw material iron powder is 25% by mass, and it rises in accordance with increase of the porous iron powder used.

The propriety of the above consideration is supported by the microscopic photographs of FIG. 10A and FIG. 10B. As shown in FIG. 10B, the pores (black portions) are rough in the sintered compact of sample S2 using the usual reduced iron powder. To the contrary, it is clear in FIG. 10A that a lot of fine pores (black portions) exist on the inside of iron particles in the sintered compact of sample S1 using the porous iron powder, and it can be grasped from the existing state of pores that many pores are open, though closed pores also exist together with them.

In accordance with the above description, the sintered compact which is produced using the porous iron powder has a metallographic structure in which fine open pores remain on the inside of the iron particles. The oil impregnation capability with open pores of the sintered bearing is adequate in compensation for the formation of a small amount of closed pores, and the permeability is suppressed at a low level because the open pores are formed fine. In the fine open pores as found in FIG. 10A, capillary action provides a attraction and holding force which works for imparting the capability to retain the lubricating oil in the sintered compact.

Comparative Example 1

The same operation as that for sample S2 of Example 1 was repeated, excepting that, in place of the reduced iron powder (trade name: NC100-24) manufactured by Hoganas AB, an iron powder of 350 meshes minus sieve (subsieve fraction) which was prepared by sifting the reduced iron powder through a sieve of 350 meshes was used as a raw material iron powder, to prepare a mixed powder of sample S5. Using this mixed powder, a plural number of sintered compacts each having a different density were prepared in the similar manner. The permeability of each of the sintered compacts was measured and the relationship between the density and the permeability of the sintered bodies were prepared. The results are shown in FIG. 6 together with the results of samples S1 and S2 in Example 1.

Figure 6:
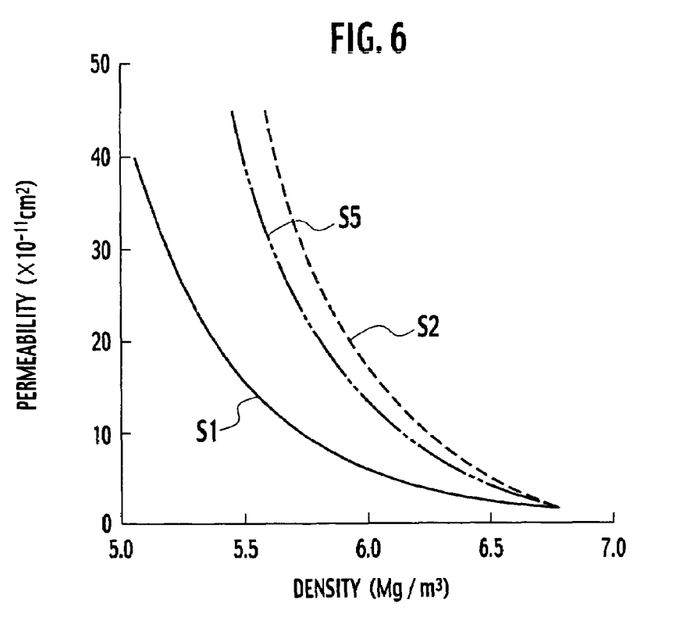
FIG. 6 is a graph showing a relationship between the density and the permeability in sintered bodies using a fine reduced iron powder.

According to FIG. 6, the permeability of the sintered compact can be reduced by making small the particles themselves of the iron powder used. However, it is clear by comparison with FIG. 2 that the effect of using fine particles is rather little. For example, the permeability of sample S5 when density is 6.0 Mg/m$^3$ is $12.5 \times 10^{-11}$ cm$^2$, which is rather close to that of Sample S2.

A mixed powder using small particles has a defect that fluidity of powder deteriorates. Considering its influence on the compacting, it may be demonstrated that use of the porous iron powder is highly advantageous to suitably adjust both of the intercommunicating porosity and the permeability of the sintered compact, rather than use of a fine powder.

Example 2

The same operation as that for sample S1 of Example 1 was repeated, excepting that the blending ratios of the raw material powders were changed for shifting the whole composition of the sintered bearing to Fe-35% Cu-1.75% Sn (sample S6) or Fe-10% Cu-0.5% Sn (sample S8), to prepare mixed powders of samples S6 and S8.

Moreover, the same operation as that for sample S2 of Example 1 was repeated, excepting that the blending ratios of the raw material powders was changed for shifting the whole composition of the sintered bearing to Fe-35% Cu-1.75% Sn (sample S7) or Fe-10% Cu-0.5% Sn (sample S9), to prepare mixed powders of samples S7 and S9.

Figure 7:
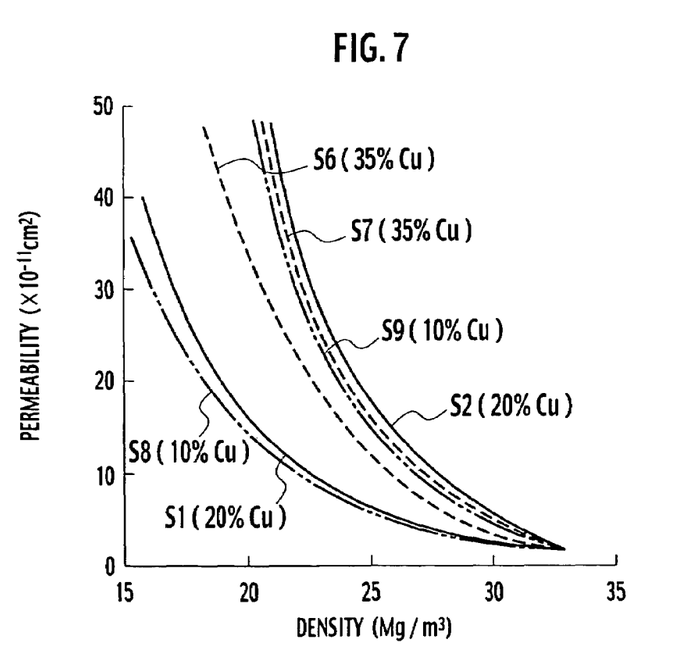
FIG. 7 is a graph showing relationships between the density and the permeability in sintered bodies having a different alloy composition.
Figure 8:
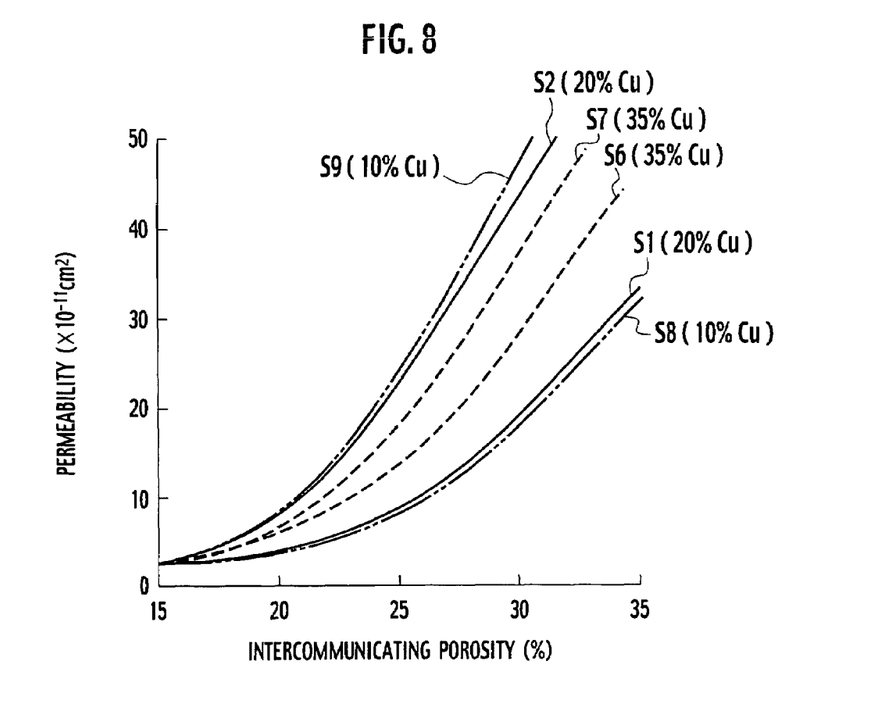
FIG. 8 is a graph showing relationships between the intercommunicating porosity and the permeability in sintered bodies of FIG. 7.

Using each of the above-mentioned mixed powders, a plural number of sintered compacts each having a different density were prepared by every sample in the same manner as in Example 1. The permeability and the intercommunicating porosity were similarly measured. Using the results of measurement, the relationship between the density and the permeability of the sintered compacts (FIG. 7) were prepared, and the relationship between the intercommunicating porosity and the permeability was also prepared (FIG. 8). The results are shown in FIG. 7 and FIG. 8 together with the results of samples S1 and S2 of Example 1.

Since the ratio of copper to tin is the same among samples S1, S2 and S6 to S9, the substantially same copper-tin alloy phase is formed in each of the sintered compacts. According to FIG. 7, the sintered compacts of samples S1, S6 and S8 using the porous iron powder have permeability which is lower than those of samples S2, S7 and S9 using the usual reduced iron powder. However, the permeability of the sintered compacts of samples S1, S6 and S8 using the porous iron powder drastically increases in accordance with rise of the contents of copper and tin. This is considered as the result of decrease of the proportion of the used porous iron powder that causes to reduce the permeability-suppressing effect of fine open pore structure, and also as the result of emphasis of the property peculiar to the copper-tin alloy phase to easily produce pores having comparatively high permeability. In contrast, in samples S2, S7 and S9, the permeability of the iron matrix phase itself is a high value due to rough pores between the iron particles. Therefore, it is considered that, since the difference in permeability between the iron phase and the copper-tin alloy phase is small, a large change is not made in the permeability of the sintered compact as a whole.

FIG. 8 also clearly shows that the sintered compacts of the samples S1, S6 and S8 using the porous iron powder are more advantageous in possessing both of low permeability and high intercommunicating porosity, than those of samples S2, S7 and S9 using the usual reduced iron powder, and that use of the porous iron powder is effective for obtaining a sintered compact in which high intercommunicating porosity and low permeability are possibly achieved. However, it is noted that it is important for making the most use of the effectiveness of the porous iron powder, not to increase the proportion of the produced copper alloy phase, and that the copper content is preferably set to 35% by mass or less. To the contrary, in samples S2, S7 and S9 using the usual reduced iron powder, it can be said preferable that the copper content is set high, because the sintered compact has a large amount of copper alloy phase in which the permeability is lower than that of the iron phase having rough pores. This point cannot be grasped from FIG. 7, however the reason can be considered because the true density is fluctuated by change in composition of the whole sintered compact. Namely, even among the same density of the sintered compacts, the relative density changes in accordance with the composition of the sintered compact and the intercommunicating porosity also differs accordingly, so that they cannot be directly compared with one another.

Moreover, the copper content in relation to intercommunicating porosity and permeability can be evaluated in the same manner as the above, also when the copper content is raised up to 40% or 50% by mass, or when it is reduced to 1% or 5% by mass, with keeping the ratio of copper to tin to the same value as the above description. Namely, if the porous iron powder is used, the permeability is low when the copper content is low, and if the usual reduced iron powder is used, the permeability is low when the copper content is low. Moreover, if an atomized iron powder is used in place of the reduced iron powder, the permeability of the sintered compact is further raised and the difference from the case of using the porous iron powder is further enlarged. This is caused by the fact that the surface area of the atomized iron powder is less than that of the reduced iron powder and that pores inside the iron powder particles are also a few.

Example 3

The same operation as that for sample S1 of Example 1 was repeated, excepting that 25% by mass of the electrolyzed copper powder used as a raw material iron powder was replaced with the same amount of a powder of copper foil (trade name: Cu—S-100) manufactured by Fukuda Metal Foil & Powder Co., Ltd., to prepare a mixed powder. Using this powder, a plural number of sintered compacts having a different density were similarly prepared. The permeability and intercommunicating porosity of each of the sintered compacts were measured and the relationship between the intercommunicating porosity and the permeability of the sintered compacts was prepared. The result is shown in FIG. 9 together with the result of sample 1 of Example 1.

Figure 9:
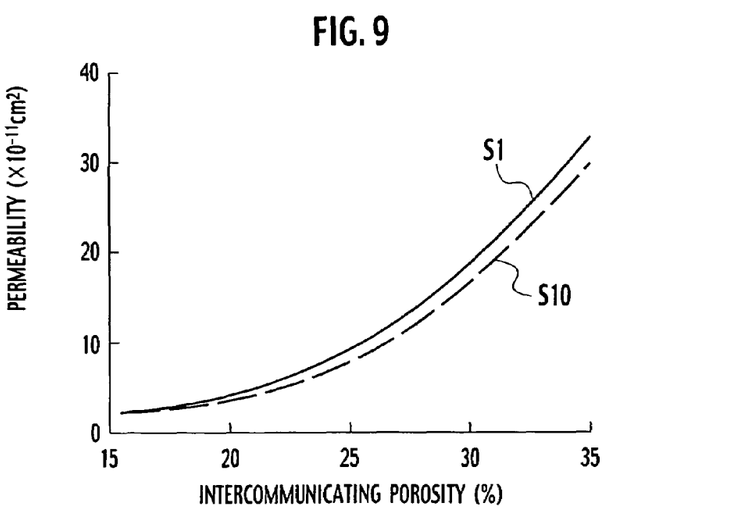
FIG. 9 is a graph showing relationships between the intercommunicating porosity and the permeability in sintered bodies using a foil copper powder.

According to FIG. 9, it can be understood that use of the powder of copper foil is effective for decreasing the permeability of the sintered compact. This is considered because the spaces which the copper powder occupies between the iron particles in green compact become narrow and complicate by using the powder of copper foil, to enlarge the permeation resistance of open pores in the sintered compact. This manner is effective for obtaining a sintered compact having low permeability and high intercommunicating porosity in alloy composition in which the copper content is comparatively large.

Example 4

The porous iron powder, the electrolyzed copper powder and the pulverized tin powder used in Example 1 were used also in this example as a raw material iron powder, a raw material copper powder and a raw material tin powder, and operations below were carried out.

Mixed powders having a different composition were prepared by mixing the raw material powders, while the ratio of the tin content relative to the copper content was kept to 5% by mass, the copper content in the whole composition was changed within a range of 1 to 50% by mass, and adding 0.3% by mass of zinc stearate to the mixture of the raw material powders. Each of the mixed powders was compression-molded to form a green compact in a columnar shape with an inner diameter of 8 mm using a compacting die. The green compacts obtained were sintered by heating ones in which the copper content was less than 10% by mass at 1000 degrees C., and ones in which the copper content was more than 10% by mass at 760 degrees C., in a nitrogen/hydrogen mix gas for 0.5 hours, to obtain the sintered compacts respectively having a density of 5.9 Mg/m$^3$. Each of the sintered compacts was sized under a predetermined condition to obtain the columnar shape sintered bearing having a density of 6.0 Mg/m$^3$. Synthetic oil in the viscosity grade equivalent to ISO VG68, comprising a poly α-olefin as a base oil and having a kinematic viscosity at 40 degrees C. of 70 mm$^2$/s (cSt) was impregnated in each of the sintered bearings in vacuum to prepare oil-impregnated sintered bearings.

The evaluation of each of the oil-impregnated sintered bearings obtained above was carried out by an actual mounting test using a fan motor. Specifically, each of the oil-impregnated sintered bearings was assembled to the fan motor, and the motor was driven at room temperature for 1,000 hours under operation conditions in which the sliding speed was 0.8 m/s and the PV value was 0.08 MPa·m/s. Then the inner bore surface of the bearing was observed.

As a result of the observation, some fine sliding cracks were found on the sliding surface in the case of a bearing containing a small amount of copper, less than 10% by mass. In comparison, any defect was not distinctly found on the sliding surface in the case of a bearing containing a large amount of copper, exceeding 10% by mass. From the above results, it is preferable that the copper content of the oil-impregnated sintered bearings composed of a Fe—Cu—Sn alloy exceeds 10% by mass. However, if the copper content is too high, permeability of the sintered bearing is raised and the amount of the synthetic oil existing on the sliding surface is severely fluctuated, resulting in deterioration of the durability of the bearing. From this point, it is desirable that the copper content does not exceed 35% by mass.

Example 5

[Oil-Impregnated Sintered Bearing A]

The mixed powder having a composition of Fe-20% Cu-1% Sn by mass, which was prepared in Example 4, was compression-molded to form a green compact in a columnar shape with an inner diameter of 8 mm, using a compacting die. The green compact obtained was sintered by heating it for 0.5 hours at 780 degrees C. in a nitrogen/hydrogen mix gas to obtain a sintered compact having a density of 6.0 Mg/m$^3$. The sintered compact was sized to obtain a sintered bearing of a columnar shape having a density of 6.05 Mg/m$^3$. The intercommunicating porosity of the sintered bearing was 19% and the permeability between the inner bore surface and the outer circumferential surface was $3 \times 10^{-11}$ cm$^2$. The same synthetic oil as used in Example 4 (base oil: a poly α-olefin, kinematic viscosity (40 degrees C.): 70 mm$^2$/s) was impregnated into the sintered bearing in vacuum to prepare an oil-impregnated sintered bearing A.

[Oil-Impregnated Sintered Bearing B]

The following operation was carried out with use, as raw material powders, of a reduced iron powder (trade name: DNC-180, particle size: 145 meshes minus sieve) manufactured by Dowa Iron Powder Co., Ltd., an electrolyzed copper powder (trade name: CE25, particle size: 145 meshes minus sieve, 80 to 90% by mass of the whole being a 350 meshes minus sieve fraction) and a powder of copper foil (trade name: CU-S-100, particle size: 100 meshes minus sieve, 35 to 55% by mass of the whole being a 350 meshes minus sieve fraction) manufactured by Fukuda Metal Foil & Powder Co., Ltd., a tin powder (trade name: Sn-325) manufactured by Nippon Atomized Metal Powders Corporation, a phosphorous-copper alloy powder (trade name: 8P—Cu—At-200) manufactured by Fukuda Metal Foil & Powder Co., Ltd. and a graphite powder (trade name: CPB) manufactured by Nippon Graphite Industries ltd.

The raw material powders were mixed at a proportion of 45% by mass of the reduced iron powder, 44% by mass of the electrolyzed copper powder, 4.5% by mass of the powder of copper foil, 2% by mass of the tin powder, 4% by mass of the phosphorous-copper alloy powder, 0.5% by mass of the graphite powder, and 0.5% by mass of the zinc stearate powder. The mixed powder was compression-molded to form a green compact in a columnar shape with an inner diameter of 8 mm, using a compacting die, in the same manner as in the oil-impregnated sintered bearing A. The green compact obtained was sintered by heating it at 760 degrees C. in a nitrogen/hydrogen mix gas for 0.5 hours, to obtain the sintered compact having a density of 6.0 Mg/m$^3$. The sintered compact was sized at the same condition as the oil-impregnated sintered bearing A, to obtain a columnar shape sintered bearing. The density of the sintered bearing was 6.2 Mg/m$^3$, the intercommunicating porosity was 21%, and the permeability between the inner bore surface and the outer circumferential surface was $18 \times 10^{-11}$ cm$^2$. The same synthetic oil as in the oil-impregnated sintered bearing A was impregnated into the sintered bearing in vacuum to prepare an oil-impregnated sintered bearing B.

[Oil-Impregnated Sintered Bearing C]

The following operation was carried out with use, as raw material powders, of a reduced iron powder (trade name: NC-100-24, particle size: 80 meshes minus sieve) manufactured by Hoganas AB, an electrolyzed copper powder (trade name: CE56, particle size: 80 meshes minus sieve, 15% by mass of the whole being a 350 meshes minus sieve fraction) manufactured by Fukuda Metal Foil & Powder Co., Ltd., a tin powder (trade name: Sn-325) manufactured by Nippon Atomized Metal Powders Corporation, and a graphite powder (trade name: CPB) manufactured by Nippon Graphite Industries Ltd.

The raw material powders were mixed at a proportion of 48% by mass of the reduced iron powder, 48% by mass of the electrolyzed copper powder, 3.5% by mass of the tin powder, 0.5% by mass of the graphite powder, and 0.5% by mass of the zinc stearate powder. The mixed powder was compression-molded to form a green compact in a columnar shape with an inner diameter of 8 mm, using a compacting die, in the same manner as in the oil-impregnated sintered bearing A. The green compact obtained was sintered by heating it at 760 degrees C. in a nitrogen/hydrogen mix gas for 0.5 hours, to obtain a sintered compact having a density of 6.0 Mg/m$^3$. The sintered compact was sized at the same condition as the oil-impregnated sintered bearing A, to obtain a columnar shape sintered bearing. The density of the sintered bearing was 6.2 Mg/m$^3$, the intercommunicating porosity was 24%, and the permeability between the inner bore surface and the outer circumferential surface was $60 \times 10^{-11}$ cm$^2$. The same synthetic oil as in the oil-impregnated sintered bearing A was impregnated into the sintered bearing in vacuum to prepare an oil-impregnated sintered bearing C.

[Evaluation of Oil-Impregnated Sintered Bearing]

For each of the oil-impregnated sintered bearings A to C obtained above, evaluation was performed with use of a bearing test machine imitating an actual motor device. Specifically, the bearing was installed on the bearing test machine to bear the shaft, and the test machine was then cooled to a temperature of −30 degrees C. in a refrigerator. Starting the operation of the test machine, it was examined whether noise was generated at the start of the operation, or not. The presence of noise was judged by means of sound which was detected by a microphone provided in the refrigerator and amplified before outputting to an outside speaker.

As a result of the above examination, noise was not detected from the oil-impregnated sintered bearings A and B at the start of operation. However, the oil-impregnated sintered bearing C generated squeaky noises.

In the above example, the oil-impregnated sintered bearing B prepared above has been tested as a reproduction of the oil-impregnated sintered bearing proposed in JP-A 2003-120674. In comparison with this, the oil-impregnated sintered bearing A contains copper at an extremely low content and does not contain other additive components. In general, since copper is a component which is soft and has good familiarity with a shaft, lowering of the copper content must normally deteriorate the sliding property of the bearing. In spite of the above, the sliding property of the oil-impregnated sintered bearing A is kept well, and it can therefore be preferably used even in a cold district condition without generating squeaky noises. The reason is because both of high intercommunicating porosity and low permeability are realized on the sintered bearing according to the present invention, by using the porous iron powder having a large surface area and an appropriate particle dimension. Then oil pressure on the sliding surface is rectified so that familiarity with a copper component is not required any more. Consequently, according to the invention, it is possible to provide an oil-impregnated sintered bearing that the most use of strength and durability of a hard iron base is made and that a sliding property preferable to endure the use in a cold district is imparted.

In the present invention, since the sintered porous alloy itself has both of high intercommunicating porosity and low permeability, it is possible, using such sintered porous alloy, to manufacture an oil-impregnated sintered bearing which is suitable for the operation conditions of various uses such as a PV value and the like, by appropriately adjusting the after-processing such as a usual sizing and selecting a lubricating oil. Namely, it is unnecessary to use a technically specific contrivance, only by using the porous iron powder for manufacture, and it is therefore advantageous from the viewpoints of production management, production cost and the like.

Moreover, since the oil-impregnated sintered bearing has a metallographic structure having fine pores on the inside of iron particles, it has high impregnation capacity for the lubricating oil and high retention capability of pores, and oil pressure on the sliding surface is appropriately retained. Accordingly, an oil-impregnated sintered bearing having a long life can be provided, and a high pressure bearing or the like is also possibly manufactured.

This application claims benefit of priority under 35 U.S.C. § 119 to Japanese Patent Application No. 2003-317834, filed on Sep. 10, 2003, the entire contents of which are incorporated by reference herein.

It must be understood that the invention is in no way limited to the above embodiments and that many changes may be brought about therein without departing from the scope of the invention as defined by the appended claims.

What is claimed is:

1. A manufacturing process of a sintered iron-copper base porous alloy for oil-impregnated sintered bearings, comprising:
    preparing a mixed powder comprising an iron powder, and at least one of a copper powder and a copper alloy powder, the mixed power at a copper content of 10 to 35% by mass, the iron powder comprising a porous iron powder, the porous iron powder having a particle size of 44 to 177 microns and having thin pores such that an apparent density is 1.3 to 2.5 $Mg/m^3$ and a specific surface area is 175 to 500 $m^2/kg$ according to a gas adsorption method;
    forming the mixed powder into a green compact; and
    sintering the green compact to obtain a sintered iron-copper base porous alloy in which pores of the porous iron powder produce intercommunicating pores.

2. The manufacturing process of claim 1, wherein the iron powder of the mixed powder further comprises an atomized iron powder or a reduced iron powder which has a particle size of 177 microns or less.

3. The manufacturing process of claim 2, wherein the ratio of the porous iron powder relative to the iron powder of the mixed powder is 25% by mass or more.

4. The manufacturing process of claim 1, wherein the mixed powder comprises the copper powder, and 60% by mass or more of the copper powder is a subsieve fraction.

5. The manufacturing process of claim 1, wherein the mixed powder further comprises a tin powder, and the tin content is 3 to 10% by mass of the total of the copper content and the tin content.

6. The manufacturing process of claim 1, wherein the mixed powder comprises the copper alloy powder which contains at least one metal selected from the group consisting of tin, zinc, nickel, boron, phosphorous and lead.

7. The manufacturing process of claim 1, wherein the green compact has a compact density of 5.5 to 6.5 $Mg/m^3$.

8. The manufacturing process of claim 1, wherein, if the copper content of the sintered iron-copper base porous alloy is 20% by mass or more, the green compact is sintered at a temperature of 750 to 850 degrees C., and, if the copper content of the sintered iron-copper base porous alloy is less than 20% by mass, the green compact is sintered at a temperature of 1,000 to 1,150 degrees C.

9. A manufacturing process of an oil-impregnated sintered bearing, comprising:
    preparing a mixed powder comprising an iron powder, and at least one of a copper powder and a copper alloy powder, the mixed power at a copper content of 10 to 35% by mass, the iron powder comprising a porous iron powder, the porous iron powder having a particle size of 44 to 177 microns and having thin pores such that an apparent density is 1.3 to 2.5 $Mg/m^3$ and a specific surface area is 175 to 500 $m^2/kg$ according to a gas adsorption method;
    forming the mixed powder into a green compact having a shape approximately corresponding to a sintered bearing which is to be oil-impregnated; and
    sintering the green compact to obtain a sintered compact composed of an iron-copper base porous alloy in which pores of the porous iron powder produce intercommunicating pores.

10. The manufacturing process of claim 9, further comprising:
    sizing the sintered compact to prepare the sintered bearing; and
    impregnating a lubricating oil into the sintered bearing to obtain the oil-impregnated sintered bearing.

11. The manufacturing process of claim 9, wherein the lubricating oil has a kinematic viscosity of 61.2 to 74.8 $mm^2/s$ at 40 degrees C.

12. The manufacturing process of claim 10, wherein the sintered compact has a density of 5.7 to 6.2 $Mg/m^3$, an intercommunicating porosity of 19 to 29% by volume, and a permeability of $10 \times 10^{-11}$ $cm^2$ or less.

13. The manufacturing process of claim 1, wherein the mixed powder contains tin at a content of 0.5 to 1.75% by mass.

14. The manufacturing process of claim 9, wherein the mixed powder contains tin at a content of 0.5 to 1.75% by mass.

* * * * *